United States Patent
Wahl et al.

(10) Patent No.: US 11,396,946 B2
(45) Date of Patent: Jul. 26, 2022

(54) TRIBOLOGICAL BODY AND METHOD FOR PRODUCING SUCH A BODY

(71) Applicant: SCHUNK KOHLENSTOFFTECHNIK GMBH, Heuchelheim (DE)

(72) Inventors: Gert Wahl, Bischoffen (DE); Konstantin Lider, Krefeld (DE); Philipp Gingter, Mönchengladbach (DE)

(73) Assignee: SCHUNK KOHLENSTOFFTECHNIK GMBH, Heuchelheim (DE)

( * ) Notice: Subject to any disclaimer, the term of this patent is extended or adjusted under 35 U.S.C. 154(b) by 488 days.

(21) Appl. No.: 16/559,908

(22) Filed: Sep. 4, 2019

(65) Prior Publication Data
US 2020/0072356 A1   Mar. 5, 2020

(30) Foreign Application Priority Data
Sep. 4, 2018   (DE) .................... 10 2018 121 508.8

(51) Int. Cl.
*F16J 15/34* (2006.01)
*F16C 33/04* (2006.01)
*F16C 33/74* (2006.01)

(52) U.S. Cl.
CPC ......... *F16J 15/3432* (2013.01); *F16C 33/046* (2013.01); *F16C 33/74* (2013.01)

(58) Field of Classification Search
CPC ...... F16J 15/3432; F16C 33/046; F16C 33/74
See application file for complete search history.

(56) References Cited

U.S. PATENT DOCUMENTS

| | | | | | |
|---|---|---|---|---|---|
| 3,433,489 | A | * | 3/1969 | Wiese | F16J 15/3432 277/408 |
| 4,189,158 | A | * | 2/1980 | Roussin | F16J 15/46 277/389 |
| 4,290,613 | A | * | 9/1981 | Scott | F16J 15/3432 277/408 |

(Continued)

FOREIGN PATENT DOCUMENTS

| | | |
|---|---|---|
| DE | 31 29 933 A1 | 6/1982 |
| DE | 10 2010 054 113 A1 | 6/2012 |

(Continued)

OTHER PUBLICATIONS

Non-English EP Search Report dated Jan. 23, 2020 in EP Application No. 19 19 4128.

(Continued)

*Primary Examiner* — Vishal A Patel
(74) *Attorney, Agent, or Firm* — Ladas & Parry LLP; Malcolm J. MacDonald

(57) ABSTRACT

The invention relates to a tribological body (10) comprising a body with a sliding surface (12) and at least one hollow space through which a fluid can flow. The body (10) consists of a first monolithic partial body (14) comprising the sliding surface (12) and of a second monolithic partial body (16) connected to the first one, wherein the hollow space is designed as a conduit (20) which runs at least in sections inside the second partial body and is delimited from the latter at least on the bottom side and the side surface sides.

25 Claims, 5 Drawing Sheets

(56) References Cited

U.S. PATENT DOCUMENTS

Figure 5:
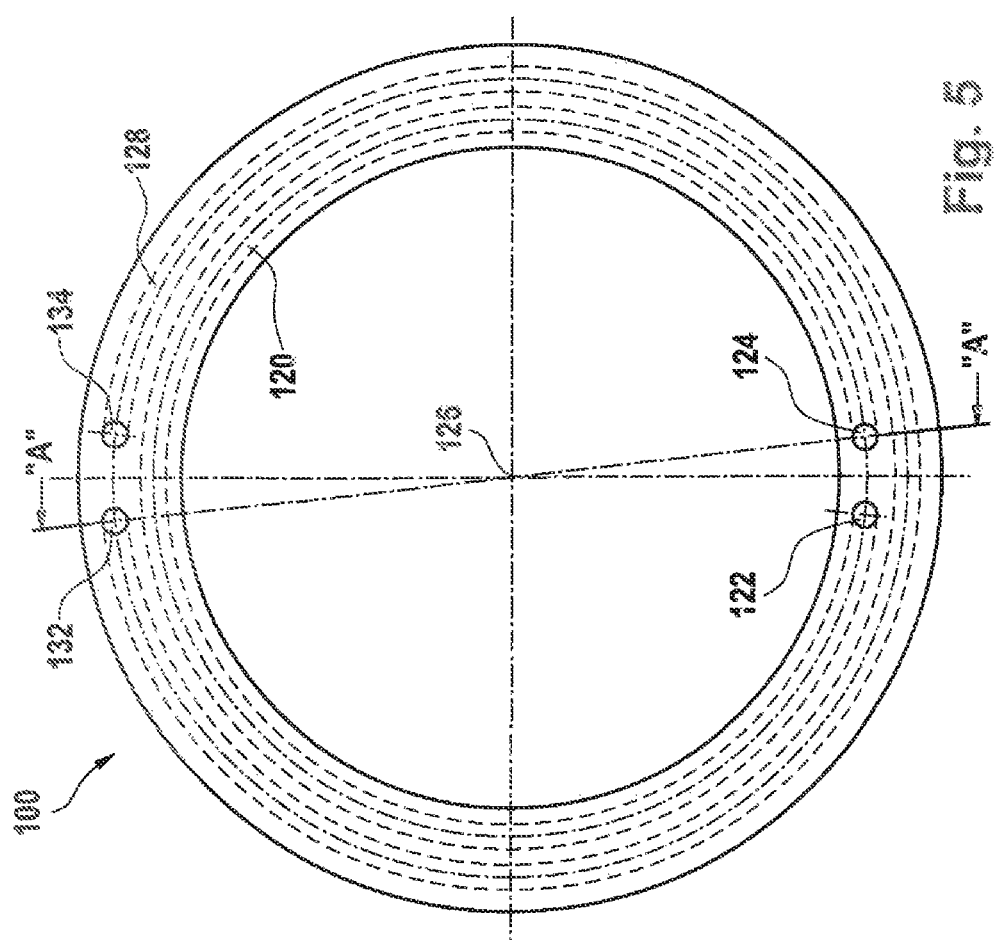

| | | | | |
|---|---|---|---|---|
| 4,365,815 A | * | 12/1982 | Scott | F16J 15/342 |
| | | | | 277/408 |
| 4,424,973 A | * | 1/1984 | Heilala | F16J 15/3492 |
| | | | | 277/318 |
| 4,575,100 A | * | 3/1986 | Hay, II | F16J 15/40 |
| | | | | 277/411 |
| 4,714,257 A | * | 12/1987 | Heinrich | F16J 15/3432 |
| | | | | 277/306 |
| 4,908,081 A | | 3/1990 | Heinrich et al. | |

FOREIGN PATENT DOCUMENTS

| | | |
|---|---|---|
| EP | 2 735 777 A1 | 5/2014 |
| GB | 1 074 036 | 6/1967 |
| WO | 2008/023235 A1 | 2/2008 |
| WO | 2016/175695 A1 | 11/2016 |

OTHER PUBLICATIONS

German Office Action, dated May 3, 2019, corresponding to German Application No. 10 2018 121 508.8.

\* cited by examiner

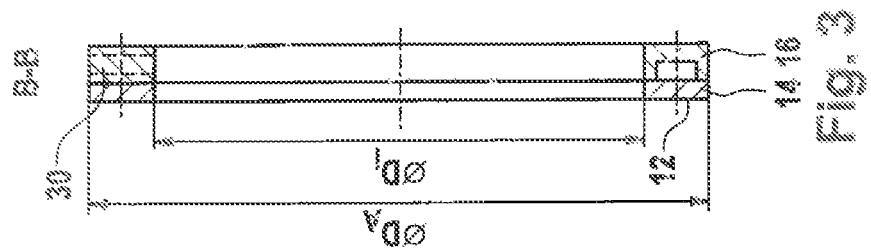
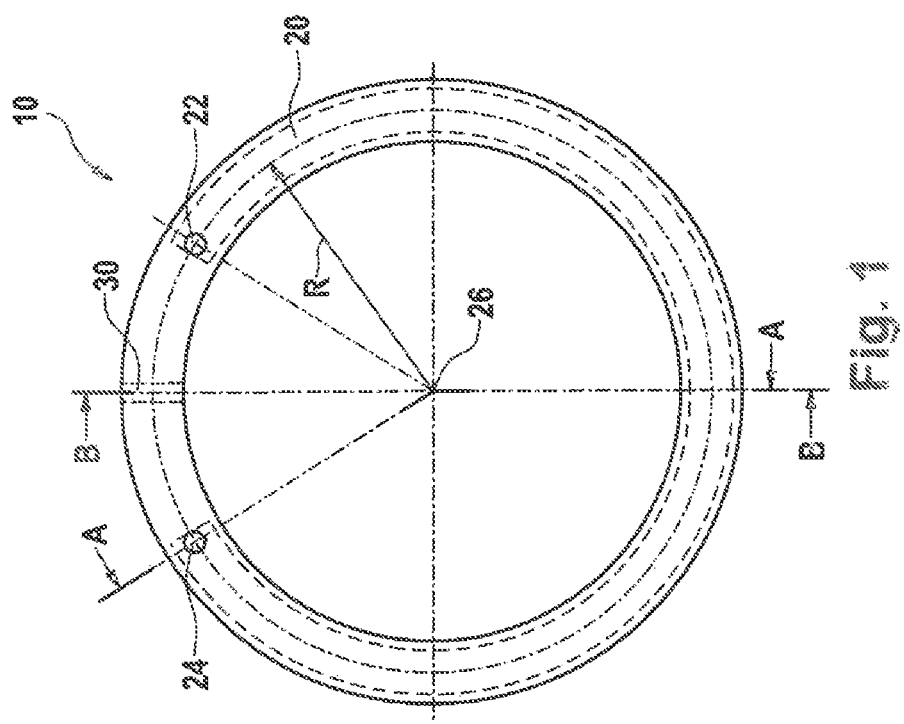
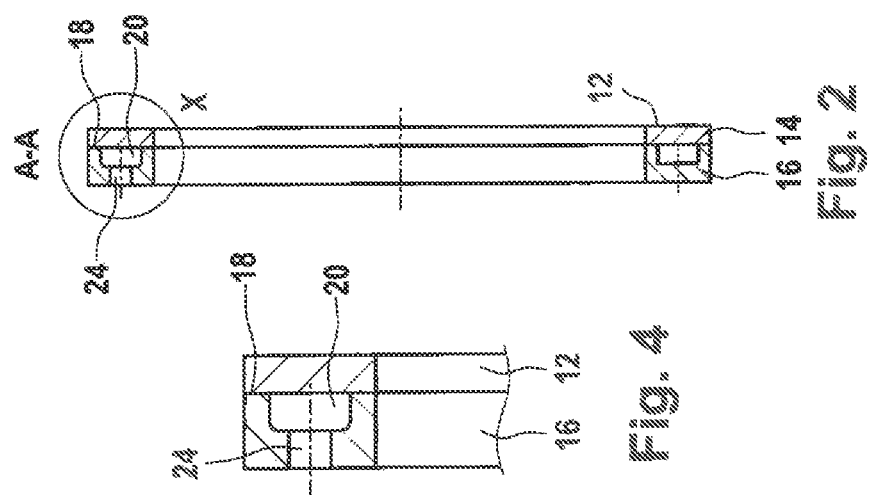

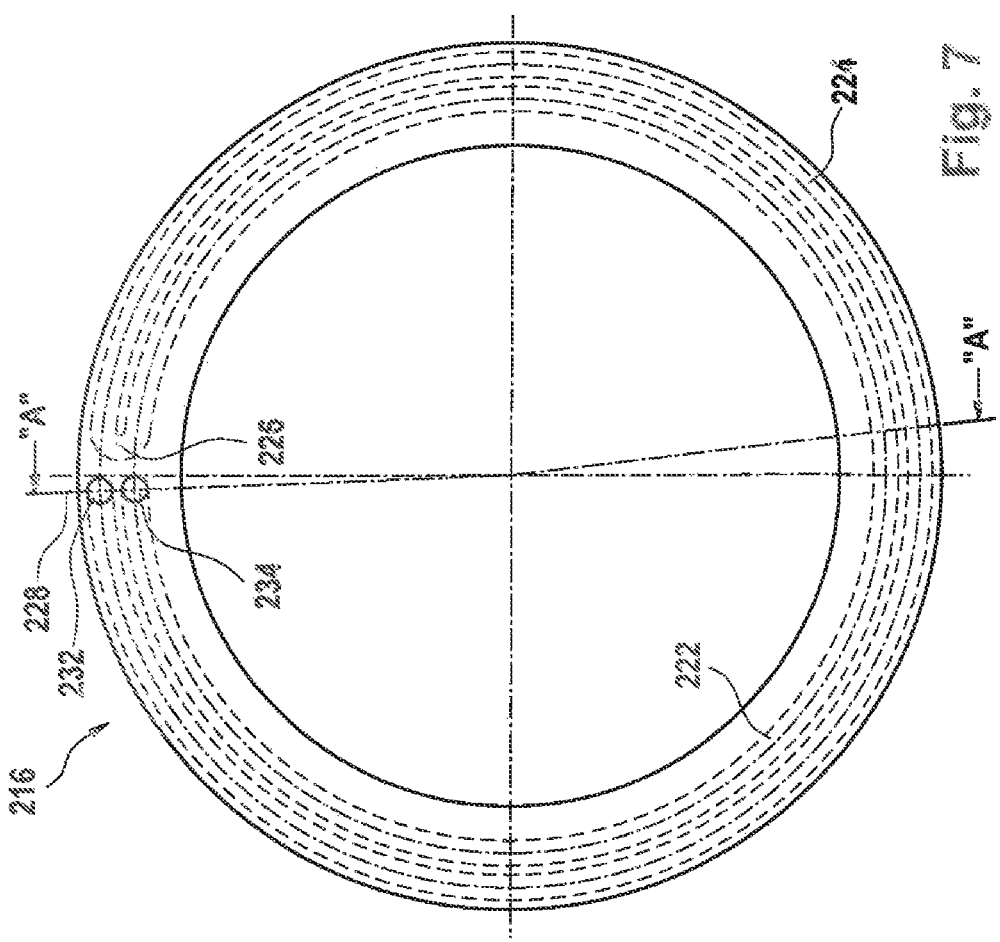
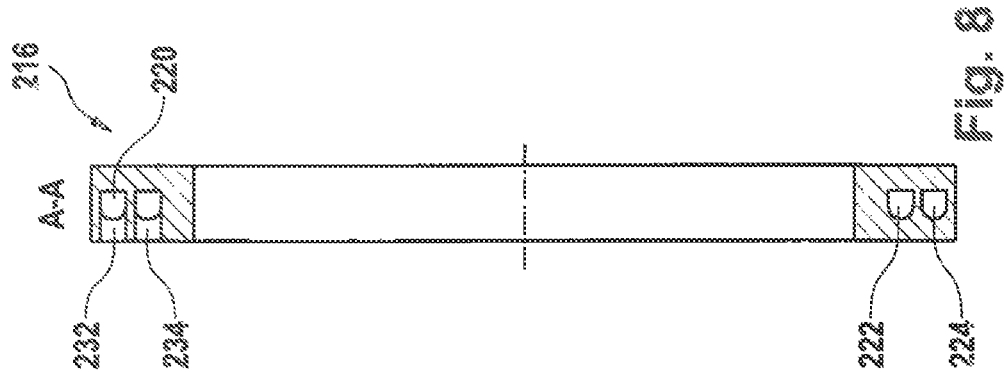

TRIBOLOGICAL BODY AND METHOD FOR PRODUCING SUCH A BODY

The invention relates to a tribological body such as a bearing, sliding element, in particular a sliding ring, comprising a body with a sliding surface and at least one hollow space through which fluid can flow.

A corresponding tribological body in the form of a sliding body is known from DE 32 13 378 C2. The sliding body comprises several rings which are axially stacked and laminated on each other and are stamped out of sheets or cards, wherein the ring arranged under the ring forming the sliding surface comprises punched-out areas separated from one another in sectors in a circumferential direction for forming hollow spaces to which cooled or heated liquid can be supplied for the elastic deformation of the sliding surface.

The geometry of the hollow spaces results in a quasi-corrugated course of the sliding surface. Independently of this, there are technical disadvantages in the production since a plurality of rings must be produced in order to provide a body in which the rings must, in addition, be sealed against each other.

DE 10 2010 054 113 A1 refers to a method for producing a seal which comprises a lamellar geometry and is produced in a generative method for fixing layers of material with a high-energy beam.

DE 19 82 170 U1 has as subject matter a sliding ring seal with a sliding ring consisting of a material with good thermally conductive properties.

A radial front surface seal is known from DE 29 38 477 A1 which comprises a sealing surface formed by a deflectable, elastic or elastically loaded element.

A sliding ring seal according to DE 31 29 933 A1 comprises two sliding rings which start from base rings in which outlet conduits are provided.

In the sealing arrangement according to DE 11 2016 001 155 T5 a sealing ring consists of carbon or of another hard material.

A gas seal according to EP 2 735 777 A1 comprises a sliding body consisting of two parts which consists on the sliding side of a porous body.

The present invention is based on the problem of further developing a tribological body and a method for producing such a body in such a manner that the body can be produced with simple constructive measures.

In comparison to the prior art, the geometry of the sliding surface should have a uniform course.

In order to solve the problem, the invention substantially provides that the body consists of a first monolithic partial body comprising the sliding surface and of a second monolithic partial body connected to the first one or comprising it, wherein the hollow space is designed as a conduit which runs at least in sections inside the second partial body and is delimited from the latter at least on the bottom side and the side surface sides.

In particular, it is provided that the conduit runs completely inside the second partial body.

In particular, it is provided that the body comprises the geometry of a ring or disk. The conduit or conduits should run concentrically or approximately concentrically to the center of the body.

The conduit or conduits should be designed to run annularly at least in sections. When observed in the direction of the sliding surface, a ring shape or a ring-shaped geometry or a shape of a ring section or a geometry of a ring-shaped section results.

It is provided in particular that the central radius of the conduit is R and that the conduit has an arc length L of at least $R \times \pi$, preferably $L \geq 3/2 \times R \times \pi$, particularly preferred $L \geq 5/3 \times R \times \pi$ and most particularly preferred $L \geq 9/5 \times R \times \pi$.

There is also the possibility that more than one conduit runs in the body, preferably two conduits, which can run in particular parallel to or approximately parallel to the sliding surface.

Of course, there is also the possibility that the conduit is windings of a helically running conduit.

However, there is also the possibility that a conduit consists of a first section and of a second section running parallel to the other, wherein the inlet opening and the outlet opening of the conduit run directly toward one another with a direct interval. If, e.g., the body has a ring geometry, then the inlet opening and the outlet opening run in a common radial plane. The first section of the conduit can then extent largely along the total circumference of the conduit and is then run back via an arc into the second section.

There is also the possibility that several conduits are formed at a distance from each other in order to achieve desired geometrical changes by the conduits themselves as a function of the fluids flowing through the individual conduits. The corresponding conduits can extend here along a common circle.

In particular in the case of sliding rings, the teaching according to the invention increases their loadability. Defined slot geometries can be set, leakages controlled and critical operating states such as dry running avoided.

A cooling of the seal can take place if liquids with the desired temperature flow through the conduit or the conduits. There is also the possibility, e.g., of influencing viscosity, the ability to lubricate and/or the vapor pressure of the sealing medium.

Since, as already cited, several conduits at a distance from each other can run in the body, not only the local rigidity of the body can be influenced but in addition, a desired geometrical change can be achieved by loading the conduits with fluids with temperatures optionally differing from each other.

Furthermore, it should be emphasized that a conduit can be filled with a phase-changing material. This is especially advantageous if the body is used in the form of a sliding ring in a start-stop operation so that the sealing conditions can be maintained constant for an extended period of time.

There is also the possibility that at least one conduit running radially or inclined to the radial direction and formed in particular in the second partial body runs in the body when it is used as a sliding ring to which conduit a cleaning liquid can be supplied in order to carry out a cleaning or sterilizing in particular in the food processing industry or in the pharmaceutical industry, that is, a so-called CIP (Cleaning in Place) or an SIP (Sterilization in Place).

In distinction to the prior art, a tribological body is provided in which at least one conduit runs through which a fluid can flow in order to adjust the geometry of the sliding surface to the desired extent based on the fluid flowing in the conduit by the temperature-dependent expansion of the monolithic partial body and to therefore purposefully influence the geometry of the sliding surface. No punctiform loading via individual hollow spaces follows, as is provided in the prior art but rather via a conduit extending preferably along the entire or almost entire circumference of the body so that a uniform influencing of the sliding surface geometry takes place.

Accordingly, the invention is distinguished in that the first and the second partial bodies have the same coefficients of thermal expansion and/or have the same thermal conductivity.

The coefficient of thermal expansion (linear coefficient of thermal expansion) should be at 20° C. in a range between 2.0 K$^{-1}$ (K=Kelvin) and 5.0 K$^{-1}$, in particular approximately 3.9 K$^{-1}$ or approximately 3.9 K$^{-1}$.

The thermal conductivity in W/(m×K) (W=watt, m=meter, K=Kelvin) at the temperature T=20° C. should be in a range of 100 to 220, in particular 150 or approximately 150.

A simple production method is made possible as a result of the fact that the body consists of the two monolithic partial bodies, which are connected to one another and form a monolith as concerns expansion and thermal conductivity after the connection. Since only two partial bodies are present in which the conduit or conduits run(s) and limit the conduit or the conduits, a simple sealing is possible.

Therefore, it is also provided in particular that the first partial body limits the conduit or the conduits, wherein, of course, there is the possibility that the conduit or the conduits run in sections in the first partial body or at least the conduit or at least one of the conduits extends completely inside the second partial body.

A further development of the invention provides that the first and/or the second partial body consist(s) of a material from the group of ceramic material, metal, artificial resin-bound carbon, carbon-graphite material, electrographite, compound fiber material, in particular silicon carbide, tungsten carbide, aluminum oxide, silicon nitride.

It is preferably provided that the second partial body, preferably the first and the second partial body consist of reaction-bound silicon carbide or contain the latter.

In particular, the first and the second partial bodies are connected to one another by siliconizing, in particular capillary siliconizing. An adhering or soldering of the partial bodies can also take place as an alternative or a supplement to the siliconizing.

In particular, it is provided that for connecting the partial bodies, they are connected positively and non-positively at their contact surfaces in order to then perform the siliconizing. However, there is also the possibility of applying a connection material, which is in particular a paste, on at least one contact surface and contains polyvinyl alcohol and silicon powder, wherein the amount of silicon should be between 30 wt. % and 60 wt. %. If the melting of the silicon takes place under a vacuum or in an atmosphere of protective gas, an embrittlement or increase of porosity in the area of the connection zone can be largely avoided. To the extent that the connection material contains carbon, e.g., in the form of carbon black, in addition to the silicon, it is possible to maximize as much as possible the relative amount of silicon, which reacts with the carbon to silicon carbide, so that the amount of free silicon is correspondingly minimized in the connection zone. This has the advantage when the body according to the invention such as a tribological body is used at high temperatures, that a melting of the free silicon is avoided in the connection zone and with it an elimination of the silicon with a simultaneous weakening of the connection zone. Moreover, the carbon forms together with the silicon a secondary silicon carbide during the reaction firing which leads to a solidification of the penetration compound.

However, the connection material can also be a pasty adhesive consisting of one or more organic binders such as polysaccharides, lignin sulfonates, polyvinyl alcohols or reaction resins such as furans and phenols as well as one or more functional fillers such as carbon in the form of carbon black or graphite powder, silicon powder, silicon carbide powder.

Other connection types are of course also possible.

Furthermore, the invention is distinguished in that the first partial body consists of a material with a granulation whose average grain size is smaller than that of the second partial body, which in particular has a granulation with an amount of 95% of silicon carbide and an average grain side of 70 μm to 200 μm. The corresponding values refer to the initial material.

The initial granulation of the material of the first partial body, in particular of silicon carbide and/or boron carbide, can have an average grain size of 5 μm to 70 μm.

A further development of the invention provides that the conduit comprises areas with cross sections deviating from each other and/or, as concerns the sliding surface, different maximum intervals from the latter. As a result of these geometrical changes and/or geometrical courses of the conduit or of the conduits, another purposeful influencing of the sliding surface geometry can be achieved in order to extend the tribological body in a purposeful manner for its areas of application.

A method for producing a tribological body such as the bearing, sliding element, in particular a sliding ring, comprises in particular the method steps:

Production of a monolithic first partial body comprising a sliding surface,

Production of a monolithic second partial body with at least one integrated conduit or section of such a conduit, and Placing the first partial body together with the second partial body and connecting them.

If conduit is used in the singular, this includes the possibility that more than one conduit runs in the tribological body. In particular, there is the possibility that two conduits run concentrically to one another, preferably in a plane extending parallel to or approximately parallel to the sliding surface.

In particular, it is provided that the second partial body is produced in such a manner that the conduit runs at least in sections completely inside the second partial body.

The invention also includes the fact that the conduit running in the second partial body is open to the limiting surface bordered by the first partial body, and that the first partial body therefore closes the conduit.

The connecting takes place or is supported in particular by a liquid siliconizing method such as support impregnation, wick impregnation and immersion impregnation, especially in situ.

Furthermore, it should be emphasized that the second partial body can be produced by an additive method which is also designated as a generative manufacturing method.

A binder jetting method can be used here, that is, a solidification of powdery material by binders.

Another additive method such as selective laser melting, selective laser sintering or electronic beam melting can also be used here.

In particular, it is provided that the second partial body is produced in the additive method by a 3D printer which operates in particular according to the laser printer method or multi-jet modeling method, wherein a building up layer-by-layer takes place preferably in layer thicknesses of 100 μm to 500 μm.

In particular, a material from the group of ceramic material, metals, artificial-resin-bound carbon, carbon-graphite material, in particular silicon carbide, boron carbide, tungsten carbide, aluminum oxide, silicon nitride, electrographite, and compound fiber material is used as material for the first and/or the second partial body.

It is preferably provided that the second partial body is produced in such a manner that the conduit runs at least in sections at least completely inside the second partial body.

The first partial body is produced in particular utilizing the method steps:
Producing an initial substance in the form of granulate or paste or slurry containing silicon carbide powder, carbon powder and binder,
Producing a preliminary body from the initial substance by ceramic shaping methods such as slurry casting, extrusion, dry pressing, isostatic pressing, sheet casting, injection molding,
Removing the preliminary body from the mold and processing it preferably to almost the final dimension,
Siliconizing the preliminary body and subsequent final processing, e.g., by sandblasting or grinding, wherein in particular the siliconizing is carried out after the previous contacting of the first partial body (14) with the second partial body to be connected to it.

If the second partial body is produced in the additive method, it is provided in particular that after the production of a preliminary body, for which SiC powder and binder are used, has taken place according to the additive method, the preliminary body is removed from the device used and residual powder is removed, an optionally multiple immersion in a carbon black suspension or a charging of carbon by Chemical Vapor Infiltration (CVI) takes place with pyrocarbon in order to then transfer, in contact with liquid or gaseous silicon and subsequent reaction firing, the preliminary body into the second partial body comprising silicon-infiltrated silicon carbide (SiSiC) under formation of secondary silicon carbide.

The siliconizing takes place here in particular during the simultaneous connecting to the first formed part, as previously explained.

A final processing subsequently takes place. It can be carried out by sandblasting and grinding.

Other details, advantages and features of the invention result not only from the claims, the features to be taken from them—alone and/or in combination—but also from the following description of preferred exemplary embodiments to be gathered from the drawings.

Figure 6:
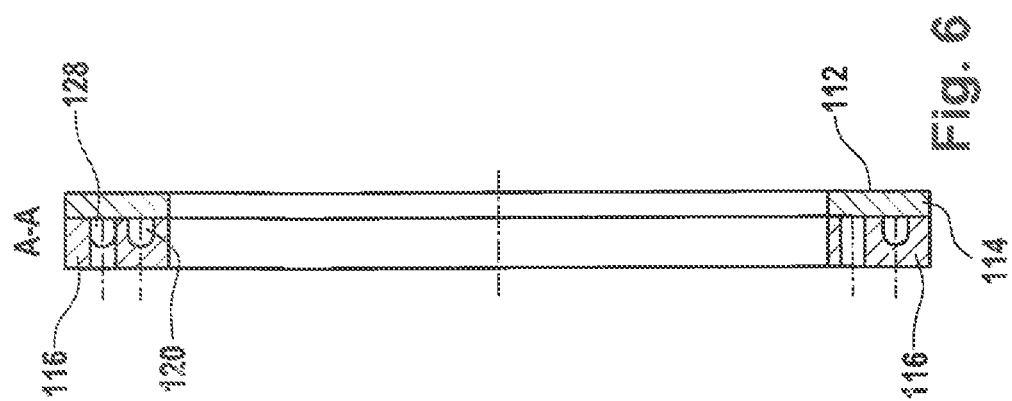
Figure 9A:
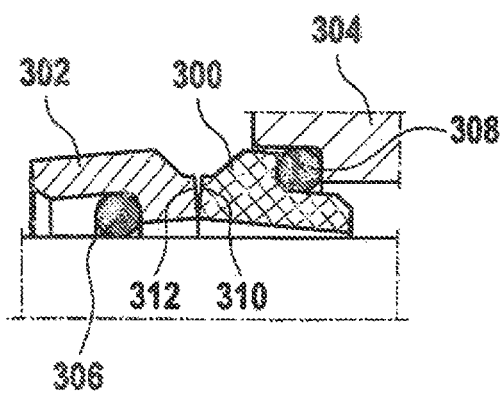
Figure 9B:
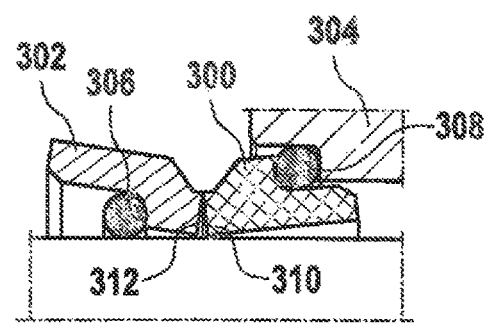
Figure 10A:
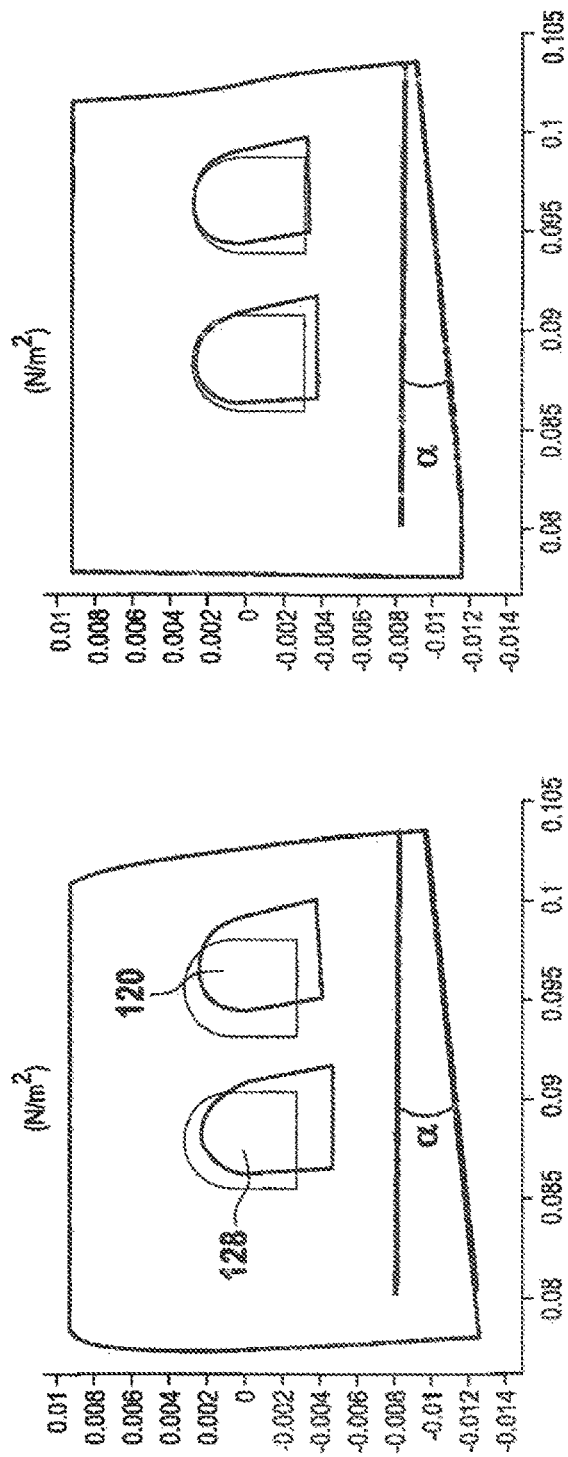
Figure 10B:
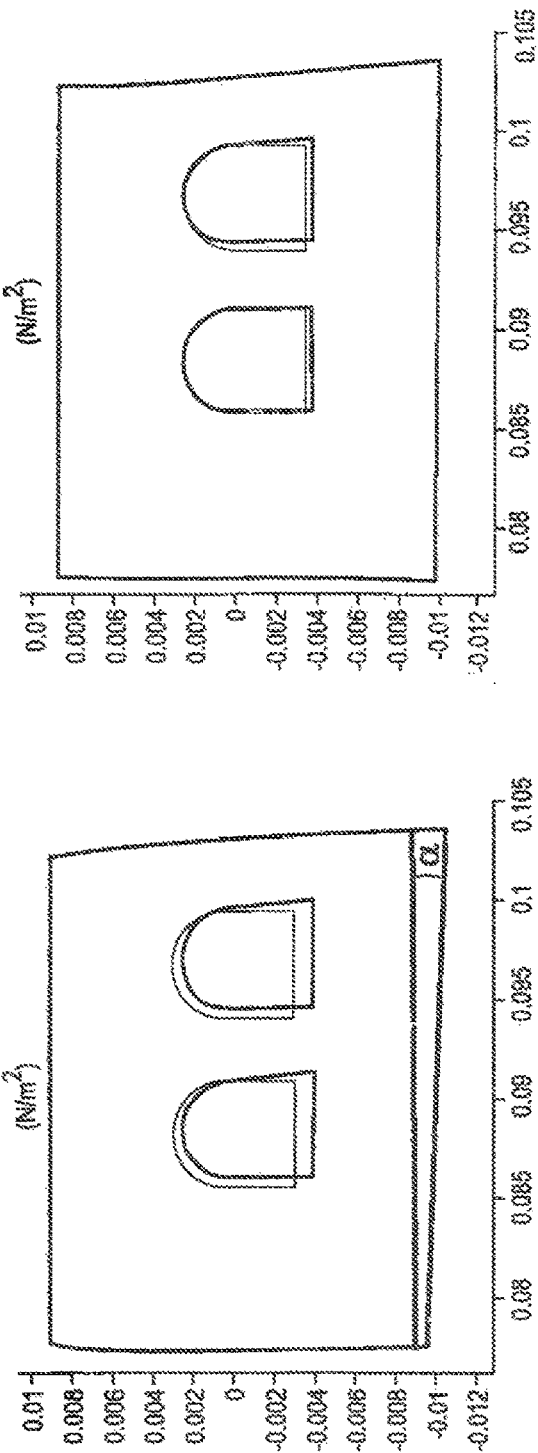

In the figures:
FIG. 1 shows a first embodiment of a sliding ring,
FIG. 2 shows a section along A-A in FIG. 1,
FIG. 3 shows a section along B-B in FIG. 4,
FIG. 4 shows a detail X in FIG. 2,
FIG. 5 shows a second embodiment of a sliding ring,
FIG. 6 shows a section along A-A in FIG. 5,
FIG. 7 shows a third embodiment of a partial body of a sliding ring,
FIG. 8 shows a section of the line A-A in FIG. 7,
FIG. 9A, FIG. 9B show basic views of sliding ring seal arrangements, and
FIG. 10A, FIG. 10B show basic views of the static sliding ring seals according to FIG. 9A and FIG. 9B with and without fluid flowing through them.

The figures, in which basically the same elements are provided with the same reference numerals, show tribological bodies in a basic form of sliding ring seals without the teaching according to the invention being limited by them. Rather, they apply in general to tribological bodies the sliding surfaces of which should be tempered, in particular cooled, optionally, however, also pre-heated, in particular in order to lengthen their service life.

FIG. 1 shows a first embodiment of a sliding ring 10 comprising a first partial body 14 comprising a sliding surface 12 and comprising a second partial body 16 connected to the latter partial body. The first and the second partial bodies 14, 16 are designed as monoliths. The assembled sliding ring 10 itself, in turn, forms a quasi-monolith since the materials of the first and of the second partial bodies 14, 16 are coordinated with each other in such a manner that the same thermal conductivities and the same coefficients of thermal expansion are present.

In particular, the first and the second partial bodies 14, 16 are produced from reaction-bound silicon carbide, wherein the partial bodies 14, 16 can deviate from one another as regards the initial granulation, in particular given the background that the first partial body 14 should have tribological properties and the second partial body 16 should be produced in an additive or generative production method.

In order to connect the first and the second partial bodies 14, 16, they are connected to one another in situ by liquid siliconizing. In addition, an adhesive can be provided between the surfaces resting on one another. Other connection types are also possible.

It is preferably provided that the soldering, that is, the connecting of the partial bodies 14, 16 to one another takes place by a paste containing silicon.

In order to produce a bonded connection between the partial bodies 14, 16, a connection material preferably comprising a silicon is applied externally onto the contact surfaces of the partial bodies 14, 16 to be connected. A melting of the connection material subsequently takes place. A connection material proved to be especially advantageous which is formed as a paste and contains polyvinyl alcohol and silicon powder. The amount of silicon should be between 30 wt %. and 60 wt. %. If the melting of the silicon takes place under a vacuum or in an atmosphere of protective gas, an embrittlement or an increase in the porosity in the area of the connection zone can be largely prevented. If an amount of carbon black is added in addition to silicon to the connection material, it is possible to maximize as much as possible the relative amount of the silicon which reacts with the carbon to form silicon carbide so that the amount of free silicon in a connection zone is correspondingly minimized. This proves to be advantageous in as far as the body consisting of the first and the second partial bodies, such as a tribological body, is used at temperatures which prevent a melting of the free silicon in the connection zone above approximately 1,400° C. and therefore prevent a separation of the silicon with a simultaneous weakening of the connection zone. Furthermore, the carbon forms together with the silicon in the reaction firing secondary silicon carbide which results in a strengthening of the penetration composite as is desired already during the firing itself since it is stabilizing.

As concerns the technical method, the following can be used in particular. Both surfaces to be contacted are preferably provided with a coating material. Then, the contact surfaces are positively and non-positively connected. The forced closure can take place here exclusively by gravity. A heating subsequently takes place to a temperature above 1,400° C. in an atmosphere of protective gas, wherein the silicon powder melts. If carbon is contained in the connection material, the silicon reacts to silicon carbide. The result of this reaction is the formation of the compound, which has a decreasing secondary content of silicon carbide as the distance from a boundary layer formed between the components, that is, the contact surfaces, increases. The carbon brings it about that a sufficient wetting of the primary silicon carbide with liquid silicon is ensured.

However, an adhesive, in particular in the form of a paste, can also be used which contains one or more organic binders such as polysaccharides, lignin sulfonates, polyvinyl alcohol or reaction resin such as furans and phenols as well as one or more functional fillers such as carbon in the form of carbon black powder or graphite powder, silicon powder, silicon carbide powder.

As already mentioned, other connection types are also possible.

In particular, for the production of the second partial body a silicon carbide granulation at 100/F, the granular distribution of which can be described with the values D10: 75 μm, D50: 115 μm, D90: 160 μm, and a binder such as furan resin are built up in layers in the additive method. An immersion with an aqueous carbon black suspension subsequently takes place. The carbon black suspension consists of 30 wt %. carbon black and contains, in addition to a dispersing agent with a polyelectrolytic base, a wetting agent. The latter brings about that the carbon black suspension attaches a first carbon black layer during the drying on the granules of the porous formed body consisting of silicon carbide or its structure without a coagulation occurring in the intermediate space. This ensures that even in the case of a multiple immersion, sufficient pore space which can be flowed through is available. A reaction firing subsequently takes place with infiltrated silicon which enters into the remaining pore space and leads to the formation of secondary silicon carbide opposite the primary silicon carbide of the granulation. The siliconizing takes place by capillary or liquid siliconizing, in particular by support impregnation, wick impregnation or immersion impregnation.

The production of the formed body can be carried out especially by laser printing methods or by multi-jet modeling methods. A layer-by-layer buildup of the formed body with layer thicknesses of 100 μm to 500 μm can take place here.

There is the possibility by the additive method of forming at least one conduit with the desired circumference in the second partial body 16, which conduit runs according to the exemplary embodiments inside the second partial body 16 on its circumferential bottom and sides and the open side of which conduit is covered by the surface 18 of the first partial body 14 facing the second partial body 16. The conduit is designated with the reference numeral 20 and comprises an inlet opening and outlet opening 22, 24 on its end in order to allow a fluid with the desired temperature to be able to flow through the conduit 18 it.

As is apparent from the view in the drawings, the conduit 20 runs coaxially to the center point 26 of the sliding ring 10 with a circular shape. The conduit 20, which has the shape in a top view of a section of a circular ring or approximately of a section of a circular ring and has a central radius R.

The outside diameter DA of the sliding ring 10 can be, e.g., 200 mm and the inside diameter DI 160 mm. The average diameter 2R of the conduit 20 can be 180 mm. The sliding ring 10 can have a thickness of, e.g., 18 mm. The thickness of the first partial body 12 should be approximately one half of that of the second partial body 16. However, all these values are not to be understood as limiting the protection.

FIGS. 5 and 6 show a second embodiment of a sliding ring 100 which differs from that of the exemplary embodiment of FIG. 1 to 4 in that two conduits 118, 128 are present in a second partial body 116 which run concentrically to one another and concentrically to the center point 126 of the sliding ring 10. Each conduit 118, 128 has an inlet opening an outlet opening 122, 124 and 132, 134. The conduits 118, 128 are covered—as in the exemplary embodiment of FIG. 1 to 4—by the first partial body 112.

The conduits 118, 128 have the geometry of a circular segment in a top view.

It should be noted that that the conduit or conduits 18, 118, 128 can run completely in the second partial body 16, 116 or partially in the second partial body 16, 116 and in the first partial body 12, 112.

There is also the possibility that the cross section of the conduits 18, 118, 128 or the maximum distance between the particular bottom surface of the conduit 18, 118, 128 as well as the sliding surface 12, 112 of the sliding ring 10, 100 can vary in the longitudinal direction of the particular conduit 20, 120, 128 in order to make possible a purposeful influencing of the temperature in the sliding surface 12, 112.

FIGS. 7 and 8 show another embodiment of a second partial body 216 which has a conduit 220 which is subdivided into two partial sections 222, 224 which are connected to one another by an arch 226.

The partial sections 222, 224 extend along almost the entire circumference of the second body 216 with an annular geometry. Inlet opening 232 and outlet opening 234 run in a radial plane 228, that is, directly adjacent to one another. As a result of this construction of the conduit 220, an evening out of the temperature over the entire circumference of the partial body 220 takes place, wherein the good heat-conducting properties of the silicon carbide are also used for the heat exchange between the sections 222, 224.

The first partial body 12, 112 is in particular a reaction-bound, silicon-infiltrated silicon carbide body with a structure comprising pores. The closed macropores have a volume of less than 8 vol. % of the first partial body 12, 112. The diameter of the macropores is between 0.05 μm and 70 μm.

The silicon carbide in powdery form is mixed with carbon powder and binder. Granulate, a paste or a slurry can be produced here. A formed body which can also be designated as a green body is then produced by ceramic shaping as a function of the initial substance by slurry casting, extrusion, dry pressing, isostatic pressing, or sheet casting. The silicon carbide has a grain size distribution between 0.1 μm and 300 μm.

A preliminary processing to almost the final dimension takes place after the removal from the mold. The preliminary body can subsequently be fired in contact with liquid or gaseous silicon present in an excess. The formed body produced in this manner has a specific weight of more than 2.8 g/cm$^3$, in particular between 2.8 g/cm$^3$ and 3.2 g/cm$^3$.

Alternatively, the siliconizing can be carried out under a protective gas together with the connecting of the second partial body 16, 116, as was previously explained.

The first partial body 12 should consist—like the second partial body 14—substantially of reaction-bound silicon carbide, wherein silicon carbide grains with the size distribution as follows can be used:
D10: 14 μm
D50: 29 μm
D90: 48 μm The silicon carbide is mixed with a binder such as furan resin and then pressed isostatically or uniaxially for forming a preform of the first partial body 12. A release and preliminary processing, e.g., by milling and/or grinding, subsequently take place. The first partial body 14 is then connected to the second partial body 16, wherein a liquid siliconizing method can be used. A final processing subsequently takes place.

Based on the formation of the conduits in the sliding ring 10, 100 and the flow through the conduits 20, 120, 128, 220 of a fluid, especially a liquid with an adjustable temperature, there is the possibility that the sliding surface 12, 112 can be cooled in a purposeful manner in order to be able to adjust desired sliding surface geometries.

Inlet openings and outlet openings can be diametrically or approximately diametrically opposite one another in the formation of two conduits, as in the exemplary embodiment of FIGS. 5 and 6. Therefore, cooling fluid can be introduced, e.g., via the openings 122, 134 into the conduits 120, 128 and removed via the openings 124, 132. This has the advantage that an evening out of the fluid temperature takes place based on the good heat transfer in the second partial body 105, 114. This additionally ensures that a desired sliding surface geometry can be adjusted.

The fact that the course of the sliding surface is influenced by the loading of the conduit or conduits 20, 120, 128 with a fluid of the desired temperature is to be illustrated using the FIGS. 9 and 10.

FIG. 9 shows a basic sliding ring sealing arrangement which comprises a sliding ring 300 and an opposing ring 302 which is connected to a shaft in a manner secured against rotation. For its part, the sliding ring 300 is fastened in a manner secured against rotation, e.g., opposite a housing 304. The sliding ring 300 and the opposing ring 302 are sealed against the shaft and against the housing 304 by the seals 306, 308. The opposing sealing surfaces 310, 312 of the sealing ring 300 and of the opposing ring 302 form a sealing slot which can have a V-shaped geometry according to FIG. 9a and an A-shaped geometry according to FIG. 9b regardless of a highly precise processing of the sealing surfaces. According to the invention, the slot angle between the sealing surfaces 310, 312 is influenced by loading the conduit or conduits 20, 120, 128 in such a manner that the slot angle α is controlled: either increased or reduced. In the exemplary embodiment the slot angle α is reduced, as is illustrated using the FIGS. 10a and 10b. These views are based on Finite Element Simulations. In the left view of FIG. 10a, the opening angle α is shown for the V-shaped slot and in FIG. 10b the one for the A-shaped slot is shown in the left view, wherein a cooling fluid does not flow through the basically represented conduits 120, 128. If there is a flow-through, the angle α is reduced, as is illustrated by the right view in FIG. 10a. As regards the A-shaped slot, the slot is even eliminated.

The teaching according to the invention results in many advantages, of which a few are explained in the following.

A cooling of a seal and the viscosity and other temperature-dependent parameters of a sealing medium can be influenced to the desired extent by the formation of the conduit or documents.

Another possibility based on the teaching of the invention is that, e.g., a seal is heated before the startup.

The geometry of the sliding surface can be adjusted, wherein in particular if several conduits are present which are spaced from each other in the circumferential direction, the local rigidity of the structural component can be influenced and/or desired changes to the geometry can be achieved.

There is also the possibility of filling a or the conduit with a phase change material such as paraffin in order to maintain the sealing conditions constant for a long time during a start-stop operation.

There is also the possibility of forming in particular another conduit running radially or inclined relative to the radial direction which runs through the limiting surfaces of the body and can be loaded with a cleaning medium or sterilization medium in order to perform a cleaning or sterilization, a s-called CIP (Cleaning in Place) or SIP (Sterilization in Place). The conduit should in particular run parallel to the sliding surface.

A corresponding cleaning conduit 30 similar to a through opening is shown in the FIGS. 1, 3.

The invention is distinguished by the following features either in isolation or at least selectively in combination to the desired extent.

A tribological body such as a bearing, sliding element, in particular a sliding ring, comprising a body with a sliding surface and at least one hollow space through which fluid can flow, wherein the body consists of a first monolithic partial body comprising the sliding surface and of a second monolithic partial body connected to the first one or comprising it, and wherein the hollow space is designed as a conduit which runs at least in sections inside the second partial body and is delimited from the latter at least on the bottom side and the side surface sides;

the first partial body limits the conduit;

the conduit runs in sections in the second partial body;

the body comprises a ring geometry or disk geometry and/or the conduit or the conduits run(s) concentrically or approximately concentrically to the center point of the body;

the center radius of the conduit is R and the conduit has an arc length L of at least R×π, preferably L≥3/2×R×π, particularly preferred L≥5/3×R×π, most particularly preferred L≥9/5×R×π;

several conduits at a distance from each other are formed in the body, in particular in the second partial body, which extend along a common circle;

the conduit has the geometry of a level spiral;

the body comprises two conduits with inlet openings and outlet openings, wherein the inlet opening of the one conduit runs diametrically or approximately diametrically to the inlet opening of the other conduit and preferably the distance of the inlet opening and the outlet opening of each conduit has an arc length KB with KB≤2/5×R×π, preferably KB≤1/5×R×π;

the conduit consists of a first section and of a second section running parallel to it, wherein the inlet opening and the outlet opening of the conduit run directly adjacent to one another;

the first and/or the second partial body consist(s) of the material from the group of ceramic material, metal, artificial resin-bound carbon, carbon-graphite material, electrographite, compound fiber material, in particular silicon carbide, tungsten carbide, aluminum oxide, silicon nitride, and preferably reaction-bound silicon carbide;

the first and the second partial bodies comprise the same coefficients of thermal expansion and/or the same thermal conductivity;

the second partial body consists of reaction-bound silicon carbide and/or boron carbide infiltrated with silicon, wherein the silicon carbide and/or boron carbide has/have a grain size distribution of $d_{10}$=75 μm, $d_{50}$=115 μm, $d_{90}$=160 μm;

the first partial body consists of reaction-bound silicon carbide and/or boron carbide infiltrated with silicon, wherein the silicon carbide and/or boron carbide have in particular an average grain size between 5 μm and 70 μm and/or a grain size distribution of D10=14 μm, D50=29 μm, and D90=48 μm;

the first partial body consists of reaction-bound silicon carbide and/or boron carbide infiltrated with silicon and has closed macropores with a pore volume <8 vol. %; diameter DP of the macropores is 0.05 μm≤DP≤70 μm;

the first partial body has a density ≥2.8 g/cm³, in particular between 2.8 g/cm³ and 3.2 g/cm³;

the first partial body is produced by slurry casting, extrusion, dry pressing, isostatic pressing, sheet casting, injection molding;

the second partial body is produced in the additive method;

a phase change material is added to the at least one conduit;

the tribological body, in particular the second partial body, is perforated by at least one through opening inclined radially or at an angle to the radial, which opening runs in particular parallel to the sliding surface.

A method for producing a tribological body such as a support, sliding element, in particular a sliding ring, comprising the method steps:

producing a monolithic first partial body comprising a sliding surface, producing a monolithic second partial body with at least one integrated conduit or a section of such a conduit, and joining the first partial body to the second partial body;

the at least one conduit is formed at least on the bottom side and side surface sides inside the second partial body and preferably runs completely in the second partial body;

the at least one conduit is limited by the second partial body;

the second partial body is produced by an additive production method;

the second partial body is produced in such a manner that the conduit runs at least in sections completely inside the second partial body;

the first partial body is connected to the second partial body by liquid siliconizing;

in order to connect the first partial body to the second partial body, they are positively and non-positively connected at their contact surfaces to be connected to each other during the siliconizing;

a connection material which is in particular pasty is applied on at least one of the contact surfaces;

a material is used as connecting material which contains polyvinyl alcohol and silicon powder, the weight component of which is preferably 30% to 60%;

in order to connect the first partial body to the second partial body, an adhesive is applied on at least one of the contact surfaces which is preferably pasty and preferably consists of one or more organic binders such as polysaccharides, lignin sulfonates, polyvinyl alcohol or reaction resin such as furans and phenols as well as one or more functional fillers such as carbon preferably in the form of carbon black or graphite powder, silicon powder, silicon carbide powder;

carbon, preferably in the form of carbon black, is added to the connection material;

in order to connect the first partial body to the second partial body, they are heated to a temperature T with T≥1,350° C., in particular T≥1.400° C.;

in order to produce the first partial body, at least the following method steps are carried out:

producing an initial substance in the form of a granulate or paste or slurry containing silicon carbide powder, carbon powder and binder, producing a preliminary body from the initial substance by ceramic shaping methods such as slurry casting, extrusion, dry pressing, isostatic pressing, sheet casting, injection molding, removing the preliminary body from the mold and processing it preferably to almost the final dimension, and siliconizing the preliminary body and subsequent final processing, e.g., by sandblasting or grinding, wherein in particular the siliconizing is carried out after the previous contacting of the first partial body with the second partial body to be connected to it;

after the production of the second partial body in the additive method it is compounded with carbon, in particular by immersion in a suspension of carbon black or by Chemical Vapor Infiltration (CVI) with pyrocarbon;

the siliconizing is carried out in situ during the connecting to the second partial body;

the second partial body is produced in the additive method by a 3D printer which operates in particular according to the laser printer method or multi-jet modeling method, wherein a building up layer-by-layer takes place preferably in layer thicknesses of 100 μm to 500 μm;

a material from the group of ceramic material, metal, artificial-resin-bound carbon, carbon-graphite material, electrographite, composite material, in particular silicon carbide, boron carbide, tungsten carbide, aluminum oxide, silicon nitride, preferably reaction-bound silicon carbide is used as material for the first and/or the second partial body.

The invention claimed is:

1. A tribological body comprising:

a body with a sliding surface and at least one hollow space through which fluid can flow, wherein the body consists of a first monolithic partial body comprising the sliding surface and of a second monolithic partial body connected to the first one or comprising it, wherein the hollow space is designed as a conduit which runs at least in sections inside the second partial body and is delimited from the latter at least on the bottom side and the side surface sides, wherein the first partial body limits the conduit, wherein the second partial body consists of reaction-bound silicon carbide and/or boron carbide infiltrated with silicon, wherein the silicon carbide and/or boron carbide has/have a grain size distribution of at least 75 μm, wherein the first partial body consists of reaction-bound silicon carbide and/or boron carbide infiltrated with silicon, wherein the silicon carbide and/or boron carbide has an average grain size between 5 μm and 70 μm and/or a grain size distribution of at least 14 μm, and closed macropores with a pore volume <8 vol. %, wherein a diameter DP of the macropores is 0.05 μm<DP<70 μm, and wherein the first partial body has a density >2.8 g/cm³.

2. The tribological body according to claim 1, wherein the body has a ring geometry or disk geometry and in that the conduit or the conduits viewed in the direction of the sliding surface has/have a ring shape or ring-shaped geometry or the shape of a ring section or a geometry shaped as a section of a ring and run(s) concentrically or approximately concentrically to the center point of the body.

3. The tribological body according to claim 1, wherein the center radius of the conduit is R and that the conduit has an arc length L of at least $R \times \pi$.

4. The tribological body according to claim 1, wherein several conduits at a distance from each other are formed in the body, in the second partial body which extend along a common circle.

5. The tribological body according to claim 1, wherein the conduit has the geometry of a level spiral.

6. The tribological body according to claim 1, wherein the body comprises two conduits with inlet openings and outlet openings, wherein the inlet opening of the one conduit runs diametrically or approximately diametrically to the inlet opening of the other conduit and the distance of the inlet opening and the outlet opening of each conduit has an arc length KB with $KB \leq 2/5 \times R \times \pi$.

7. The tribological body according to claim 1, wherein the conduit consists of a first section and of a second section running parallel to it, wherein the inlet opening and the outlet opening of the conduit run directly adjacent to one another.

8. The tribological body according to claim 1, wherein the first and the second partial bodies have a same coefficients of thermal expansion and/or have a same thermal conductivity.

9. The tribological body according to claim 1, wherein the first partial body is produced by slurry casting, extrusion, dry pressing, isostatic pressing, sheet casting, injection molding and/or in that the second partial body is produced in the additive method.

10. The tribological body according to claim 1, wherein a phase change material is introduced into the conduit.

11. The tribological body according to claim 1, wherein the second partial body, is perforated by at least one through opening inclined radially or at an angle to the radial, which opening runs parallel to the sliding surface.

12. The tribological body according to claim 1, wherein the first partial body has a density between 2.8 g/cm³ and 3.2 g/cm³.

13. The tribological body according to claim 3, wherein $L \geq 3/2 \times R \times \pi$.

14. The tribological body according to claim 3, wherein $L \geq 5/3 \times R \times \pi$.

15. The tribological body according to claim 3, wherein $L \geq 9/5 \times R \times \pi$.

16. The tribological body according to claim 6, wherein $KB \leq 1/5 \times R \times \pi$.

17. A method for producing a tribological body, comprising the method steps:
producing a body with a sliding surface and at least one hollow space through which fluid can flow,
wherein the body consists of a first monolithic partial body comprising the sliding surface and of a second monolithic partial body connected to the first one or comprising it, wherein the hollow space is designed as a conduit which runs at least in sections inside the second partial body and is delimited from the latter at least on the bottom side and the side surface sides,
wherein the first partial body limits the conduit,
wherein the second partial body consists of reaction-bound silicon carbide and/or boron carbide infiltrated with silicon, wherein the silicon carbide and/or boron carbide has a grain size distribution of at least 75 µm,
wherein the first partial body consists of reaction-bound silicon carbide and/or boron carbide infiltrated with silicon, wherein the silicon carbide and/or boron carbide has an average grain size between 5 µm and 70 µm and/or a grain size distribution of at least 14 µm, and closed macropores with a pore volume <8 vol. %, wherein a diameter DP of the macropores is 0.05 µm<DP<70 µm, and
wherein the first partial body has a density >2.8 g/cm³, joining the first partial body to the second partial body.

18. The method according to claim 17, wherein the conduit is formed at least on the bottom side and side surface sides inside the second partial body and runs completely in the second partial body, and/or in that the conduit is limited by the second partial body.

19. The method according to claim 17, wherein the second partial body is produced by an additive production method, wherein the second partial body is produced in such a manner that the conduit runs at least in sections completely inside the second partial body.

20. The method according to claim 17,
wherein the first partial body is connected to the second partial body by liquid siliconizing,
wherein in order to connect the first partial body to the second partial body, they are positively and non-positively connected at their contact surfaces to be connected to each other during the siliconizing, and
wherein a connection material which is pasty is applied on at least one of the contact surfaces,
wherein a material is used as connecting material which contains polyvinyl alcohol and silicon powder, the weight component of which is 30% to 60%, and
wherein carbon, in the form of carbon black, is added to the connection material.

21. The method according to claim 17, wherein, in order to produce the first partial body, at least the following method steps are carried out:
producing an initial substance in the form of a granulate or paste or slurry containing silicon carbide powder, carbon powder and binder,
producing a preliminary body from the initial substance by ceramic shaping methods selected from slurry casting, extrusion, dry pressing, isostatic pressing, sheet casting, injection molding,
removing the preliminary body from the mold and subsequently processing it to almost the final dimension, and
siliconizing the preliminary body and subsequent final processing,
wherein the siliconizing is carried out after the previous contacting of the first partial body with the second partial body to be connected to it,
wherein after the production of the second partial body in the additive method it is compounded with carbon, by immersion in a suspension of carbon black or by Chemical Vapor Infiltration with pyrocarbon, and wherein the siliconizing is carried out in situ during the connecting to the second partial body.

22. The method according to claim 17, wherein, in order to connect the first partial body to the second partial body, they are heated to a temperature T with $T \geq 1{,}350°$ C.

23. The method according to claim 21, wherein, in order to connect the first partial body to the second partial body, an adhesive is applied on at least one of the contact surfaces which is pasty and consists of one or more organic binders selected from polysaccharides, lignin sulfonates, polyvinyl alcohol, furans and phenols, as well as one or more functional fillers in the form of carbon black or graphite powder, silicon powder, silicon carbide powder.

24. The method according to claim 17, wherein the second partial body is produced in the additive method by a 3D printer which operates according to the laser printer method or multi-jet modeling method, wherein a building up layer-by-layer takes place in layer thicknesses of 100 μm to 500 μm.

25. The method according to claim 22, wherein $T \geq 1.400°$ C.

\* \* \* \* \*